(12) United States Patent
Zhang et al.

(10) Patent No.: US 9,024,597 B2
(45) Date of Patent: May 5, 2015

(54) SYSTEM AND METHOD FOR CONTROLLING DCM-CCM OSCILLATION IN A CURRENT-CONTROLLED SWITCHING MODE POWER SUPPLY CONVERTER

(71) Applicant: STMicroelectronics (Shenzhen) R&D Co. Ltd., Nanshan, Shenzhen (CN)

(72) Inventors: Hai Bo Zhang, Shenzhen (CN); Jin Li, Shenzhen (CN); Yong Jun Wu, Shenzhen (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 275 days.

(21) Appl. No.: 13/658,995

(22) Filed: Oct. 24, 2012

(65) Prior Publication Data
US 2013/0169248 A1    Jul. 4, 2013

(30) Foreign Application Priority Data

Dec. 31, 2011 (CN) .......................... 2011 1 0461963

(51) Int. Cl.
*H02M 3/158* (2006.01)
*H02M 1/00* (2006.01)

(52) U.S. Cl.
CPC ....... *H02M 3/158* (2013.01); *H02M 2001/0025* (2013.01); *H02M 2001/0032* (2013.01); *Y02B 70/16* (2013.01)

(58) Field of Classification Search
CPC ..................... H02M 3/158; H02M 2001/0025; H02M 3/156; H02M 3/1588; Y02B 70/16; Y02B 70/1466
USPC .................................. 323/222, 271, 282–285
See application file for complete search history.

(56) References Cited

U.S. PATENT DOCUMENTS

2010/0066328 A1*  3/2010  Shimizu et al. ............... 323/282

* cited by examiner

*Primary Examiner* — Adolf Berhane
*Assistant Examiner* — Yemane Mehari
(74) *Attorney, Agent, or Firm* — Gardere Wynne Sewell LLP (57) ABSTRACT

A constant-frequency current-mode-controlled boost converter circuit provides slope compensation of an inductor current, reduces reverse inductor current in light output load conditions, and reduces oscillation between a discontinuous current mode and a continuous current mode by enabling or disabling an inductor current threshold. The constant-frequency current-mode-controlled boost converter circuit is efficient and stable in light, medium, and heavy output load conditions.

28 Claims, 11 Drawing Sheets

SYSTEM AND METHOD FOR CONTROLLING DCM-CCM OSCILLATION IN A CURRENT-CONTROLLED SWITCHING MODE POWER SUPPLY CONVERTER

PRIORITY CLAIM

This application claims priority from Chinese Application for Patent No. 201110461963.8 filed Dec. 31, 2011, the disclosure of which is hereby incorporated by reference.

BACKGROUND

1. Technical Field

The present invention relates generally to power supply converter circuitry and, more particularly, to a current-controlled, switching mode power supply converter circuit that is stable in light, medium, and heavy output load conditions.

2. Introduction

Switching mode power supply systems are often implemented in handset equipment to power various components such as, for example, active-matrix organic light-emitting diode (AMOLED) panels. Such applications typically require large current capacity as well as accurate output voltage and low output voltage ripple in order to provide lighting that is comfortable to the human eye. As such, constant-frequency current-mode-controlled converter circuitry is commonly used in this context. When compared to other structures (e.g., voltage-mode-controlled converters, constant-on variable-frequency converters, and constant-off variable-frequency converters), the constant operation frequency of the constant-frequency current-mode-controlled converter circuitry reduces frequency spectrum interference experienced by other circuitry in the system. However, conventional constant-frequency current-mode-controlled converter circuitry is not stable in all output load conditions, oftentimes resulting in the converter oscillating between a discontinuous current mode (DCM) and a continuous current mode (CCM). Therefore, there exists a need for a constant-frequency current-mode-controlled converter circuit that is suitable for handset applications, and is efficient and stable in light, medium, and heavy output load conditions.

SUMMARY

The present disclosure provides a system and method for controlling DCM-CCM oscillation in a current-controlled switching mode power supply converter circuit. One embodiment provides a current-controlled switching mode power supply converter circuit comprising: driver circuitry operable to control charging and discharging of an inductor; and current-sensing circuitry operable to sense a load condition of the integrated circuit; wherein the current-sensing circuitry is further operable, in response to a first load condition, to enable an inductor current threshold and, in response to a second load condition, to disable the inductor current threshold; and wherein the driver circuitry is further operable to reduce the discharging of the inductor when an output inductor current reaches the inductor current threshold.

Another embodiment provides a method for controlling DCM-CCM oscillation in a current-controlled switching mode power supply converter circuit, the method comprising: charging the inductor to generate an inductor current; sensing a load condition of the integrated circuit; enabling an inductor current threshold if the integrated circuit is operating in a first load condition; disabling the inductor current threshold if the integrated circuit is operating in a second load condition; discharging the inductor at a first rate when an output inductor current is greater than the inductor current threshold; and discharging the inductor at a second rate when the output inductor current is less than the inductor current threshold.

Yet another embodiment of the present disclosure provides a method for controlling charging and discharging of an inductor in a current-controlled switching mode power supply converter circuit, the method comprising: charging the inductor to generate an inductor current; comparing the inductor current to a reference current; selecting a high inductor current threshold if a peak value of the inductor current is greater than the reference current; selecting a low inductor current threshold if the peak value of the inductor current is less than the reference current; and discharging the inductor at a first rate until an output inductor current is less than the high inductor current threshold.

Another embodiment of the present disclosure provides a current-controlled switching mode power supply converter circuit comprising: driver circuitry operable to control charging and discharging of an inductor; and current-sensing circuitry operable to compare an inductor current to a reference current; wherein the current-sensing circuitry is further operable to select a high inductor current threshold if a peak value of the inductor current is greater than the reference current, and to select a low inductor current threshold if the peak value of the inductor current is less than the reference current; and wherein the driver circuitry is further operable to discharge the inductor at a first rate until an output inductor current is less than the high inductor current threshold.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not necessarily drawn to scale, in which like reference numbers indicate similar parts, and in which.

DETAILED DESCRIPTION OF THE DRAWINGS

Figure 1A:
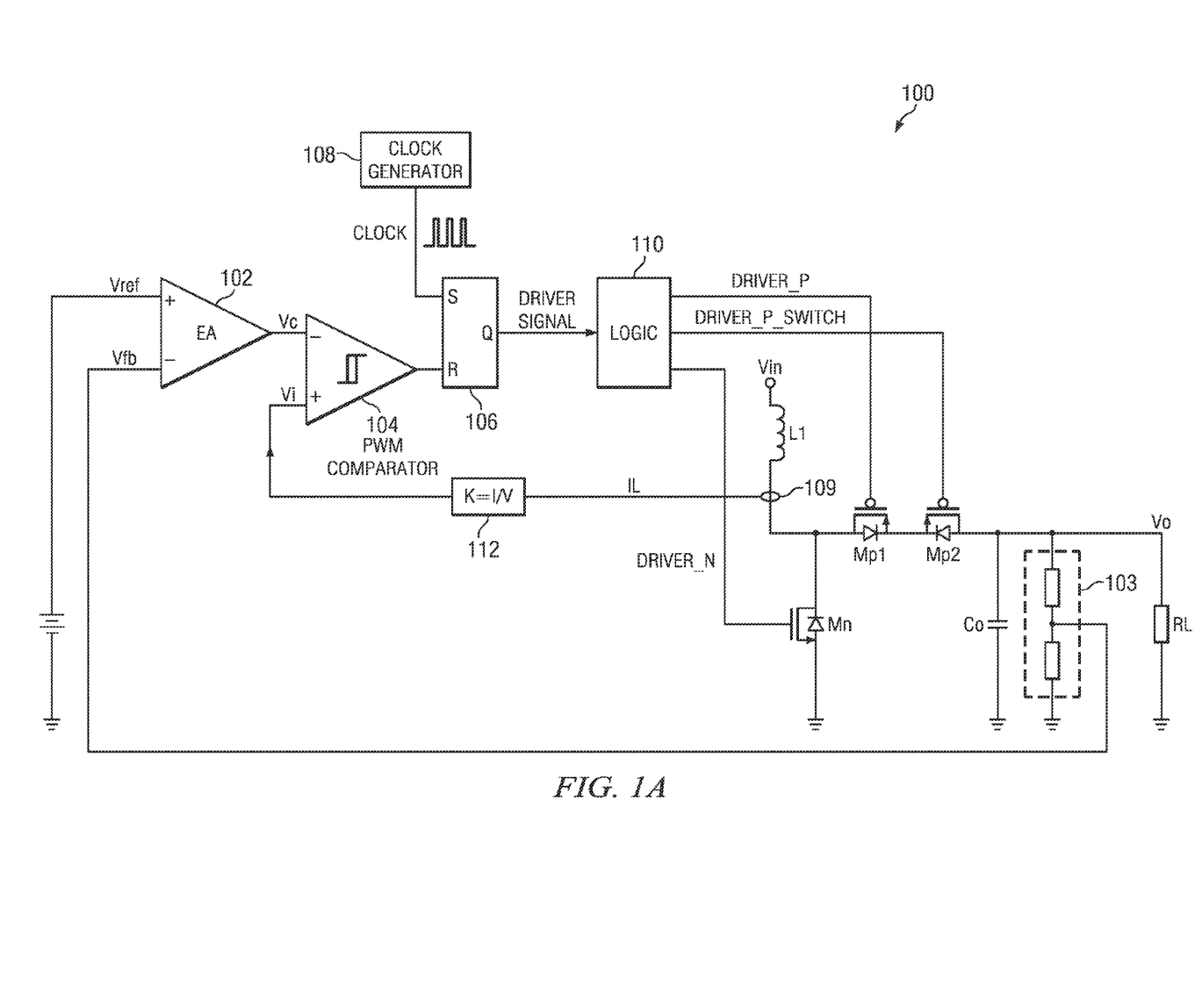
FIG. 1A illustrates an example embodiment of a constant-frequency current-mode-controlled boost converter circuit.

FIG. 1A illustrates an example embodiment of a constant-frequency current-mode-controlled boost converter circuit 100. Although a boost converter circuit is described herein, it should be appreciated that the disclosure may also be applied to buck converter or buck-boost converter circuitry as well. The boost converter circuit 100 comprises an error amplifier 102 receiving a reference voltage Vref and a feedback voltage Vfb from a voltage divider 103, wherein the output of the error amplifier 102 is provided to a PWM comparator 104 as voltage Vc. The voltage Vc received at the PWM comparator 104 is compared to a voltage Vi. The voltage Vi is provided by current-to-voltage converter circuitry 112 coupled to a current sensor 109 at an inductor L1, wherein the voltage Vi is representative of the current IL across the inductor L1.

The circuit 100 further comprises a flip-flop 106 receiving, at its first input, the output of the PWM comparator 104, and receiving at its second input a clock signal generated by a clock generator circuit 108. The flip-flop 106 produces a driver signal for controlling operation of logic circuitry 110, wherein the logic circuitry 110 is responsive to the driver signal to control operation of transistors Mp1, Mp2, and Mn to control charging of the inductor L1. The circuit 100 also includes output filtering circuitry comprised of a storage capacitor Co and a load resistor RL.

Figure 1B:
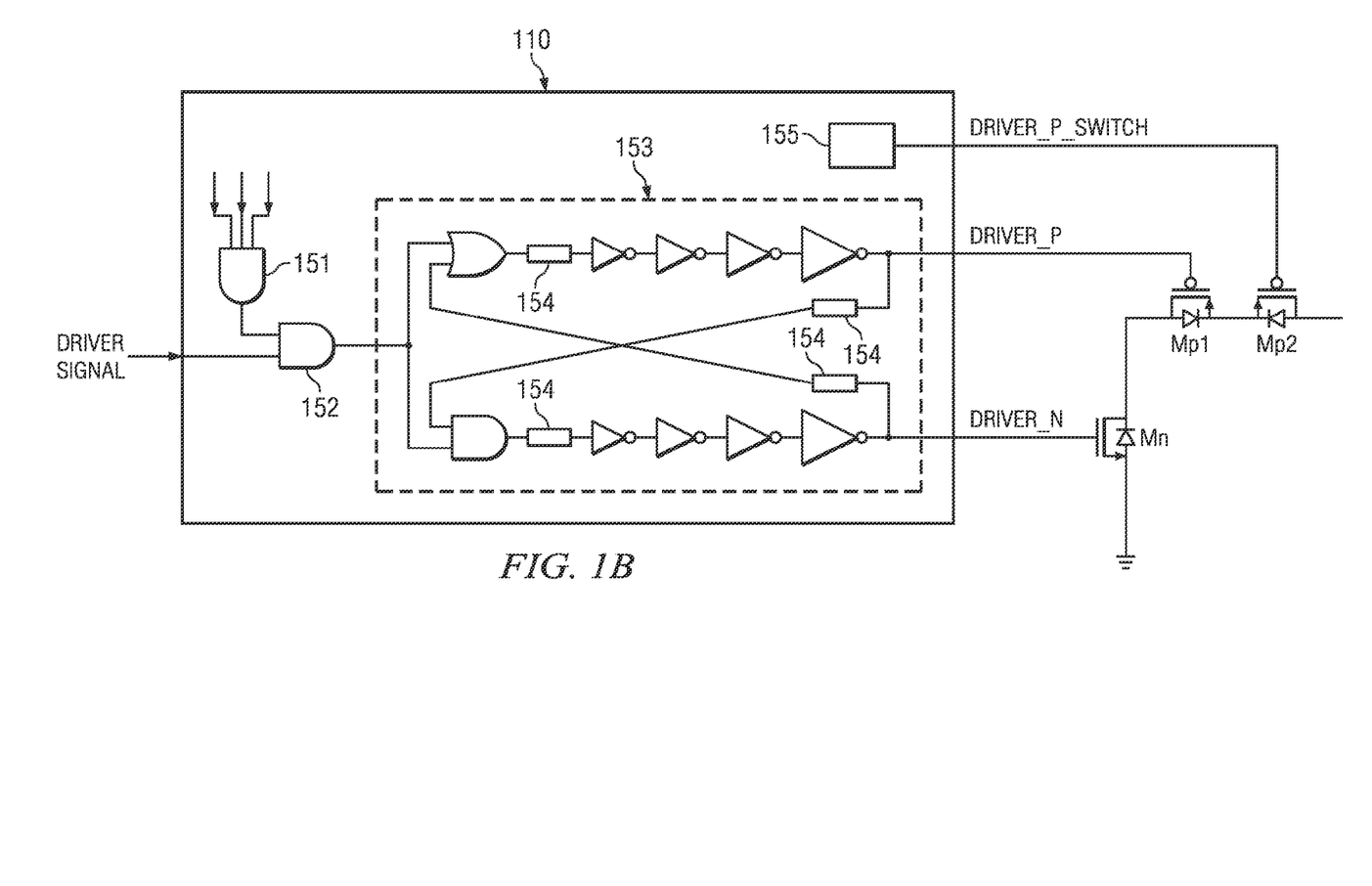
FIG. 1B illustrates an example embodiment of the logic circuitry illustrated in FIG. 1A.

FIG. 1B illustrates an example embodiment of the logic circuitry 110 illustrated in FIG. 1A. As shown in FIG. 1B, the logic circuitry 110 may comprise a gate 151 that receives inputs related to, for example, overtemperature protection and overcurrent protection. Logic circuitry 110 also includes a logic gate 152 for receiving the driver signal from the flip-flop 106 and the output of gate 151, wherein the output of the gate 152 controls circuitry 153. Circuitry 153 includes level shifter circuitry 154 and is operable to generate a signal (Driver_P) for controlling operation of transistor Mp1, and a signal (Driver_N) for controlling operation of transistor Mn. The logic circuitry 110 further comprises circuitry 155 operable to generate a signal (Driver_P_Switch) for controlling transistor Mp2. When the circuit 100 is operating in a soft-start period, transistor Mp2 operates as a rheostat, and the resistance of Mp2 slowly changes from a large resistance to several hundred milliohms to prevent inrush current. After the soft-start period is terminated, Mp2 may provide a resistance at the output.

Figure 2:
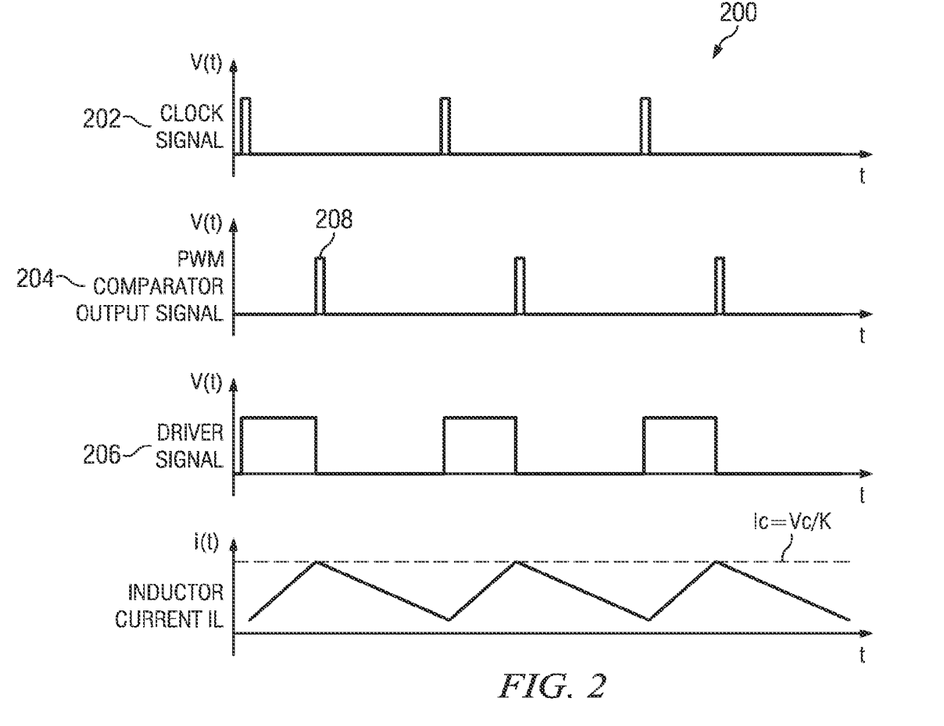
FIG. 2 illustrates example voltage and current waveforms of the constant-frequency current-mode-controlled boost converter circuit illustrated in FIG. 1A.

FIG. 2 illustrates waveforms 200 corresponding to the components comprising the circuit 100 illustrated in FIG. 1A, wherein the waveforms 200 include the clock signal 202, PWM comparator output signal 204, driver signal 206, and inductor current IL. Steady state operation of the circuit 100 is further described herein with reference to the waveforms 200 illustrated in FIG. 2. Responsive to the clock signal 202 generated by the clock generator circuit 108, the flip-flop 106 produces a logic high driver signal 206. The high state of the driver signal 206 then triggers the logic circuitry 110 to turn on transistor Mn to increase the current IL across the inductor L1 while transistors Mp1 and Mp2 are turned off. When the inductor current IL reaches a PWM comparator threshold Ic, the PWM comparator 104 generates a pulse 208 to reset the flip-flop 106 causing the logic circuitry 110 to turn off transistor Mn. When transistor Mn is turned off, transistors Mp1 and Mp2 are turned on and the inductor L1 begins to discharge current into the storage capacitor Co.

Figure 3:
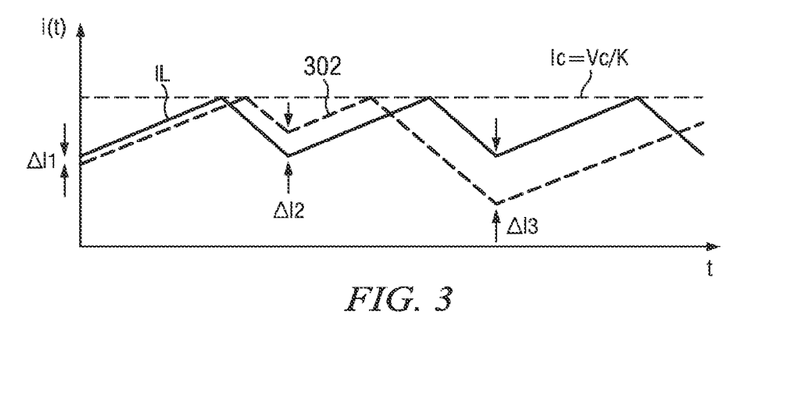
FIG. 3 illustrates an example waveform of an inductor current of the circuit illustrated in FIG. 1A, wherein the inductor current has an amplified perturbation.

When the circuit 100 illustrated in FIG. 1A has a relatively large duty cycle (e.g., D>0.5), a small perturbation of the inductor current IL may become exacerbated for each period, thereby causing the circuit 100 to become increasingly unstable. This instability is illustrated in FIG. 3 as an oscillation (see perturbed waveform 302) of the inductor current IL, which shows perturbation ΔI of the inductor current IL of the circuit 100 for an example duty cycle greater than 0.5. Accordingly, a first perturbation $\Delta I_1$ is shown for a first period, a second perturbation $\Delta I_2$ is shown for a second period, and a third perturbation $\Delta I_3$ is shown for a third period, wherein the perturbation ΔI increases for each subsequent period.

Figure 4:
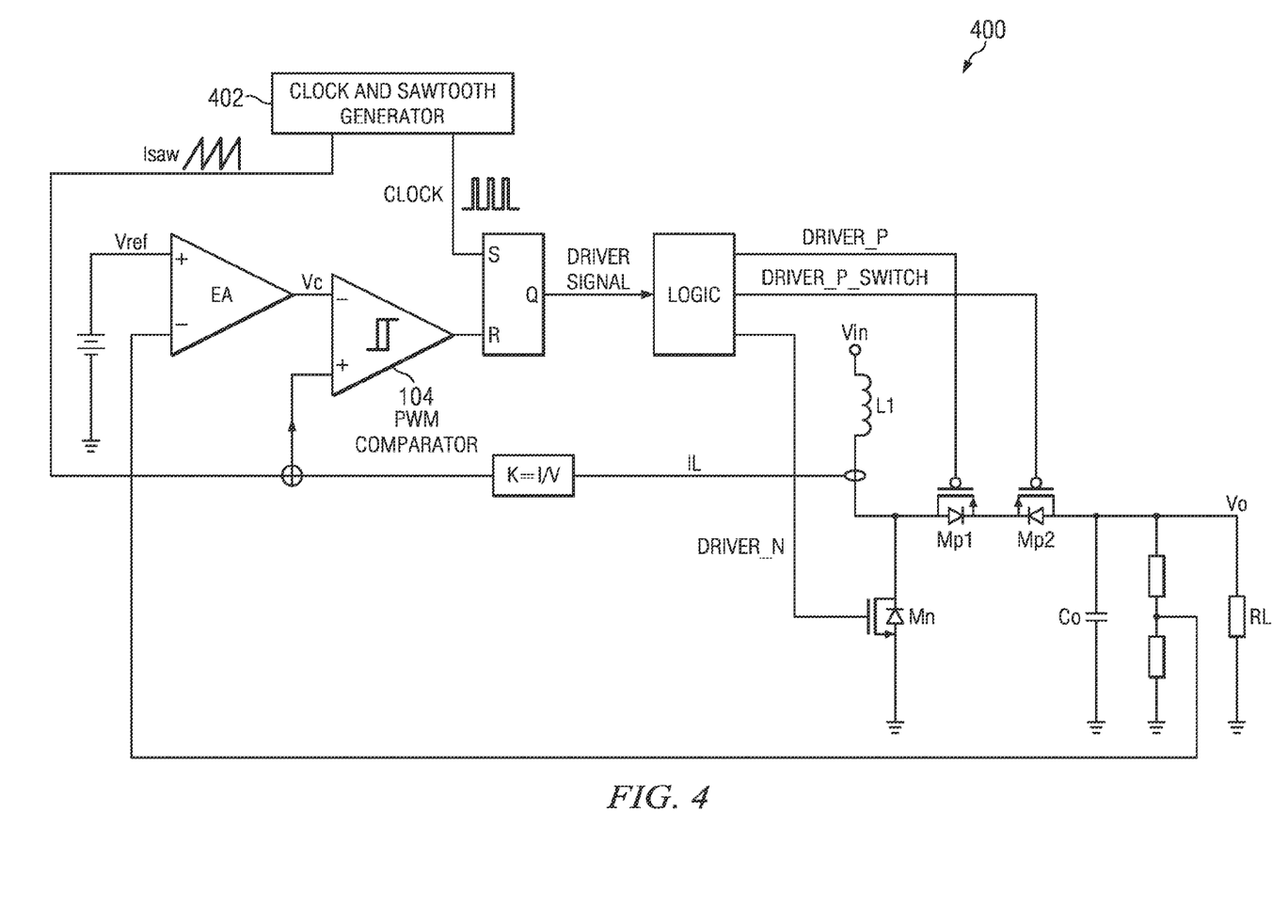
FIG. 4 illustrates an example embodiment of a constant-frequency current-mode-controlled boost converter circuit with slope compensation.

In order to avoid oscillation of the inductor current IL, the circuit 100 illustrated in FIG. 1A may be modified to include slope compensation of the inductor current IL to thereby reduce perturbation ΔI of the inductor current IL. The circuit modified to include slope compensation is illustrated in FIG. 4, and is now referred to hereinafter as circuit 400. Accordingly, circuit 400 illustrates an example embodiment of a constant-frequency current-mode-controlled boost converter circuit 400, wherein the circuit 400 includes slope compensation of the inductor current IL. As shown in FIG. 4, slope compensation is provided by a sawtooth waveform Isaw generated by a clock and sawtooth generator 402. The sawtooth waveform Isaw is then subtracted from the PWM comparator threshold Ic, to provide a slope compensation waveform supplied to the PWM comparator 104.

Figure 5:
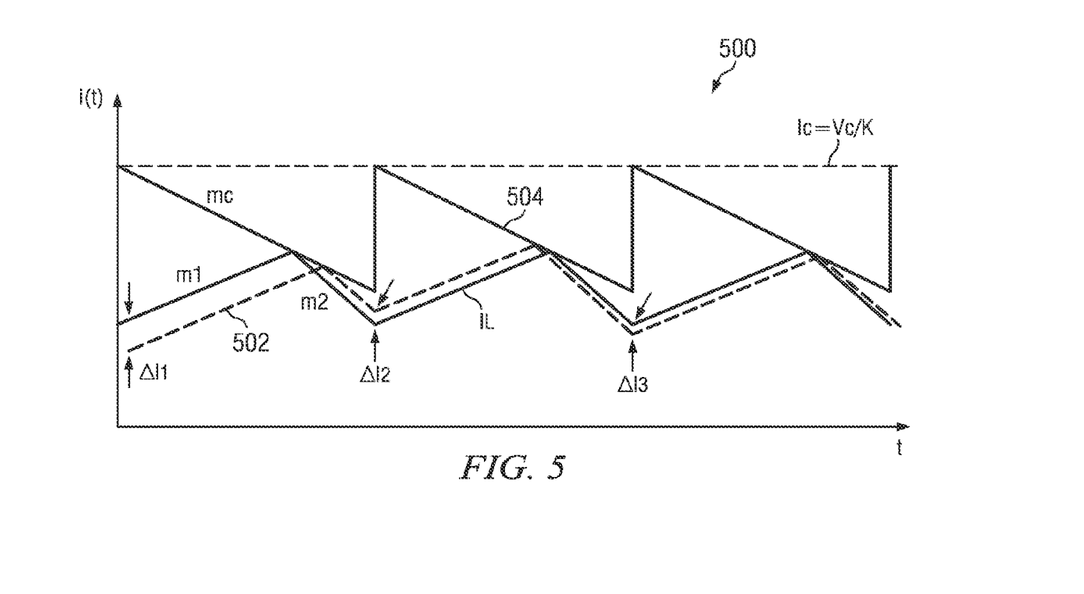
FIG. 5 illustrates an example waveform of an inductor current of the circuit illustrated in FIG. 4, wherein the inductor current includes slope compensation.

FIG. 5 illustrates example waveforms 500 of the circuit 400 illustrated in FIG. 4 for an example duty cycle greater than 0.5. The waveforms 500 illustrated in FIG. 5 include the inductor current IL, the perturbed inductor current waveform 502, and a slope compensation waveform 504. As illustrated in FIG. 5, the slope compensation waveform 504 is at its peak value (set by the PWM threshold Ic) at time t=0, and linearly decreases during each period of operation of the circuit 400 as a result of the sawtooth waveform Isaw (not shown). During each period, the inductor current IL and the perturbed inductor current 502 rise until they equal the value of the slope compensation waveform 504. At that time, the inductor L1 begins to discharge, and the inductor current IL and perturbed inductor current 502 begin to decrease.

In the embodiment illustrated in FIG. 5, the inductor current IL and perturbed inductor current waveform 502 rise at a first slope m1, and decrease at a second slope m2. In the embodiment illustrated in FIGS. 4 and 5, the slope mc of the slope compensation waveform 504 is selected to be greater than half of the second slope m2 (i.e., mc>0.5*m2) in order to attenuate perturbation of the inductor current IL. As shown in FIG. 5, the perturbation ΔI for each period (i.e., $\Delta I_1$, $\Delta I_2$, and $\Delta I_3$) is therefore attenuated.

Figure 6:
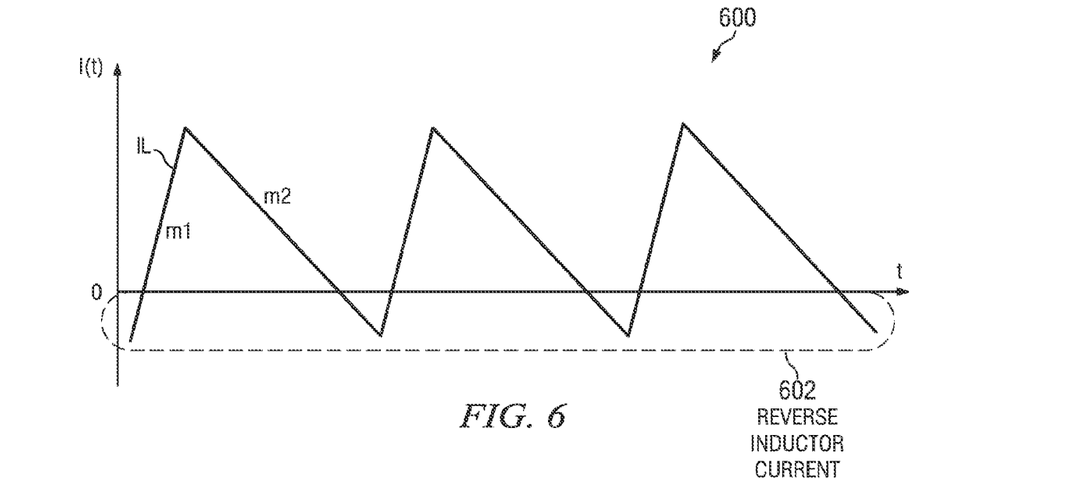
FIG. 6 illustrates an example waveform of a reverse inductor current for the circuit illustrated in FIG. 4.

Unfortunately, during light output load conditions, the constant-frequency current-mode-controlled boost converter circuit 400 illustrated in FIG. 4 may produce reverse inductor current. An example inductor current waveform 600 is provided in FIG. 6, wherein reverse inductor current is indicated by sections marked by the reference number 602.

Figure 7:
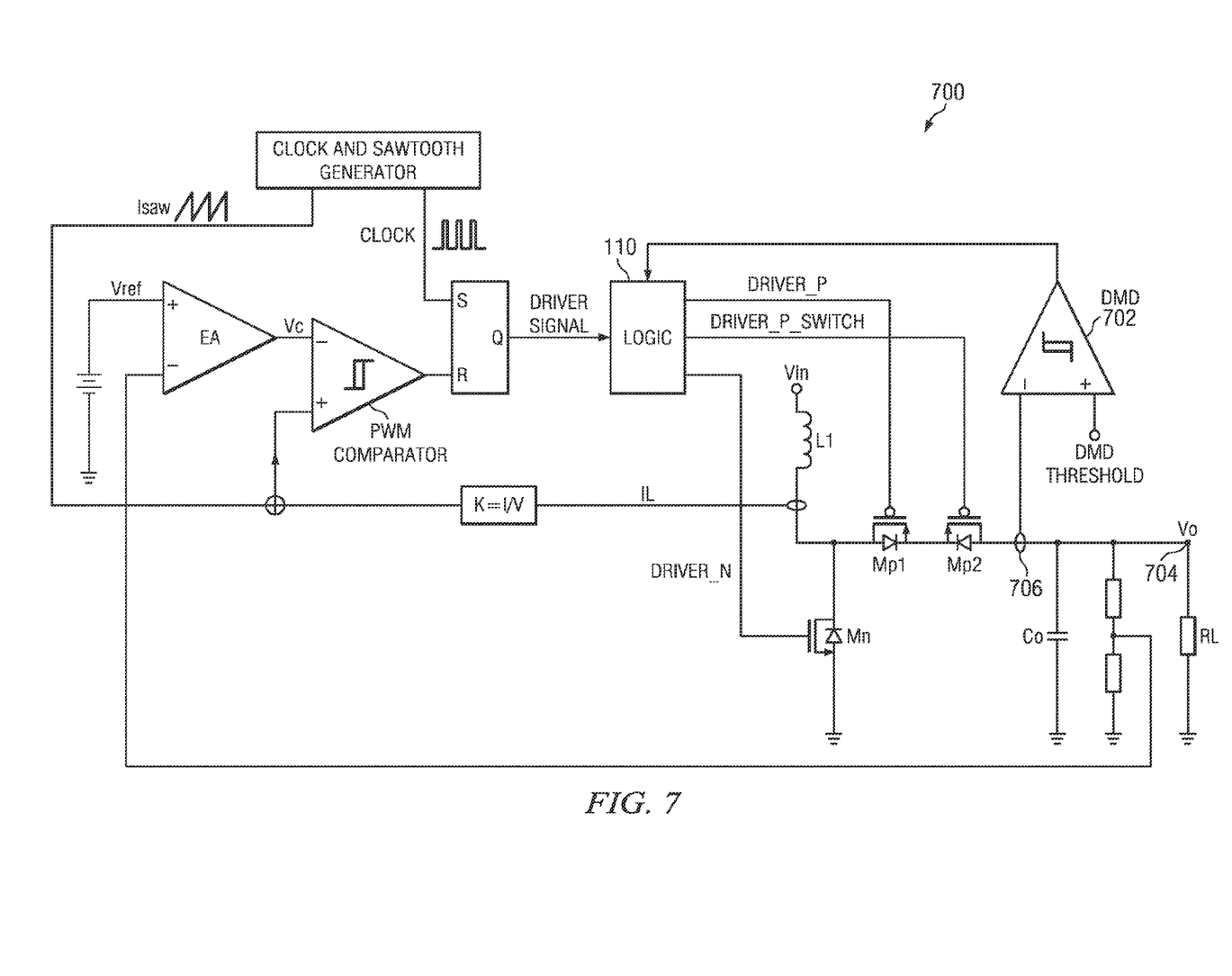
FIG. 7 illustrates an example embodiment of a constant-frequency current-mode-controlled boost converter circuit incorporating current detection and control circuitry.

In order to avoid reverse inductor current in light output load conditions, the circuit 400 illustrated in FIG. 4 may be modified to include current detection and control circuitry coupled to the output of the circuit 400. The modified circuit is illustrated in FIG. 7 and is now referred to hereinafter as circuit 700. Accordingly, circuit 700 illustrates an example embodiment of a constant-frequency current-mode-controlled boost converter circuit 700, wherein the circuit 700 includes slope compensation of the inductor current IL and reduces reverse inductor current in light output load conditions. As illustrated in FIG. 7, the current detection and control circuitry comprises a comparator 702 coupled to the output node 704 of the circuit 700. At a first input, the comparator 702 receives the inductor current sensed at the output node 704 (also referred to herein as the output inductor current ILo) by a current sensor 706, and receives, at a second input, a fixed threshold value. The current detection and control circuitry 702 reduces reverse inductor current by sending a control signal to cause the logic circuitry 110 to shut down transistor Mp1 when the output inductor current ILo reaches the fixed threshold value as the inductor L1 discharges. In the embodiment illustrated in FIG. 7, the fixed threshold value is selected such that when transistor Mp1 is turned off, the output inductor current ILo decreases to zero before the end of each period, thereby causing the circuit 700 to operate in discontinuous current mode (DCM). Therefore, the threshold is otherwise referred to herein as the discontinuous mode detection (DMD) threshold, and the current detection and control circuitry 702 is otherwise referred to herein as DMD circuitry 702.

Figures 8, 11:
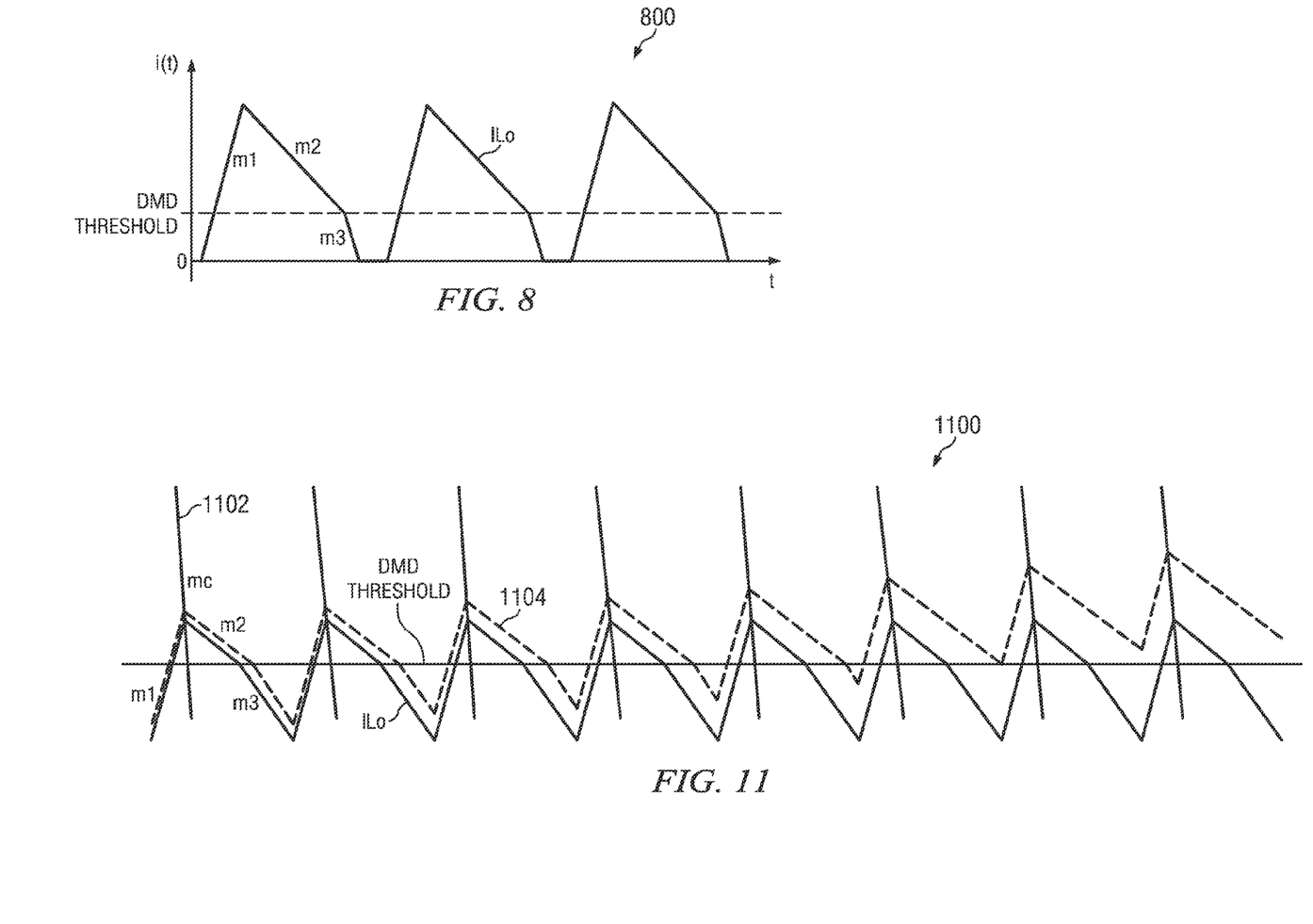
FIG. 8 illustrates an example waveform of an output inductor current of the circuit illustrated in FIG. 7, wherein the current detection and control circuitry is in a light load condition.
FIG. 11 illustrates example waveforms of DCM-CCM oscillation of an output inductor current caused by improper slope compensation and a fixed current detection and control circuitry threshold.

FIG. 8 illustrates an example waveform 800 of an output inductor current ILo in accordance with the circuit 700 illustrated in FIG. 7, wherein the circuit 700 is operating in a light output load condition. The output inductor current ILo has a first slope m1 as the inductor L1 charges, a second slope m2 as the inductor L1 begins to discharge, and a third slope m3 after the discharging output inductor current ILo reaches the DMD threshold. When the DMD circuitry 702 causes the logic circuitry 110 to shut off transistor Mp1, the voltage drop across Mp1 causes the output inductor current ILo to decrease at an accelerated rate. Accordingly, the absolute value of the falling slope m3 is greater than the absolute value of the falling slope m2, as shown in FIG. 8.

Figure 9A:
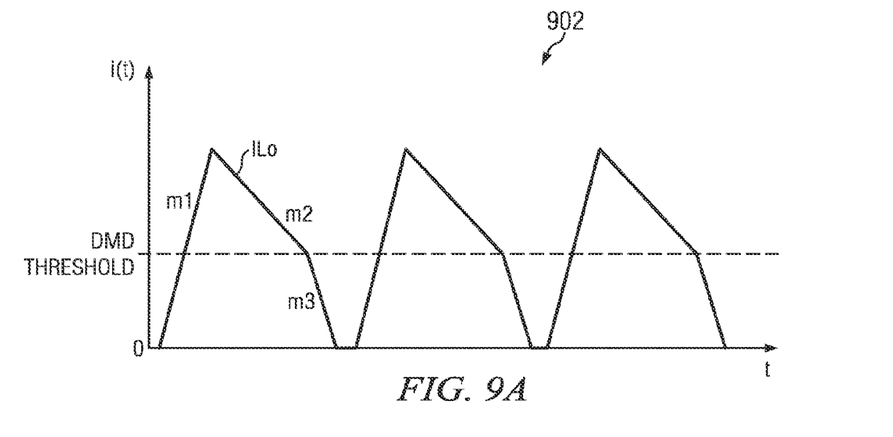
FIGS. 9A, 9B, and 9C illustrate example waveforms of an output inductor current for various output load conditions of the circuit illustrated in FIG. 7.
Figure 9B:
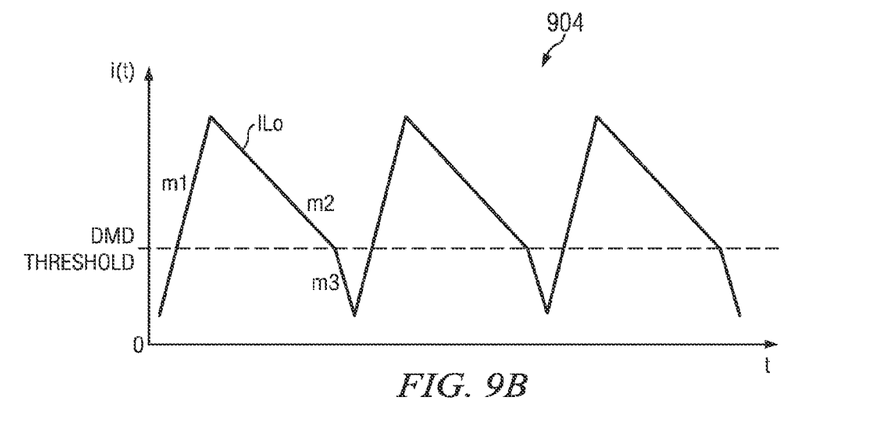
Figure 9C:
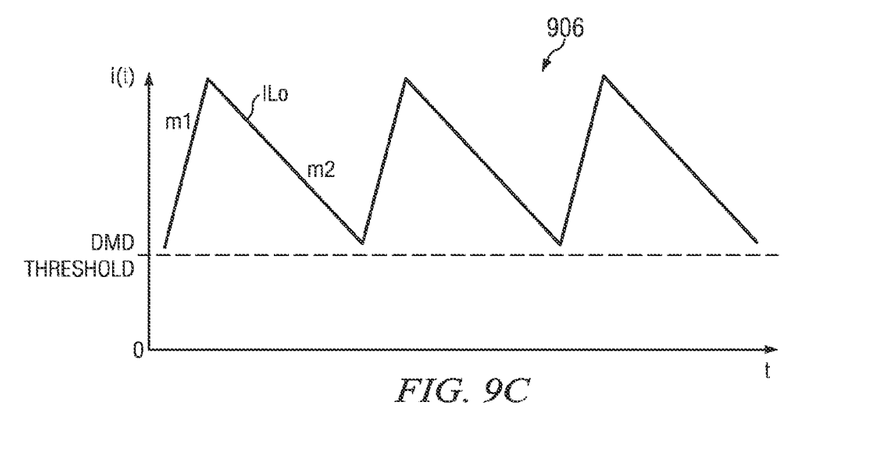

The integration of the DMD circuitry 702 results in three types of waveforms of output inductor current ILo, wherein each type of output inductor current waveform is caused by one of three different output load conditions: light load, middle load, and heavy load. FIGS. 9A, 9B, and 9C illustrate example waveforms for each of the different output load conditions, wherein FIG. 9A illustrates an example waveform 902 for a light load condition, FIG. 9B illustrates an example waveform 904 for a middle load condition, and FIG. 9C illustrates an example waveform 906 for a heavy load condition.

In the light load condition, the converter circuit 700 operates in the discontinuous current mode, and thus, the minimum output inductor current ILo is zero. The waveform 902 illustrated in FIG. 9A is similar to the waveform 800 illustrated in FIG. 8. When the output inductor current ILo reaches the fixed DMD threshold, the logic circuitry 110 turns off transistor Mp1, and the slope of the output inductor current ILo changes from m2 to m3. As shown in FIG. 9A, the output inductor current ILo reduces to zero before the end of each period. It should be appreciated by one of ordinary skill in the art that the circuit 700 illustrated in FIG. 7 is stable during the light load condition because the output inductor current ILo reduces to zero for each period and, therefore, any perturbation of the output inductor current ILo is "reset" for each period.

In the middle load condition, the converter circuit 700 operates in continuous current mode, and thus, the minimum output inductor current is greater than zero. However, in this embodiment, the inclusion of a DMD threshold may cause the circuit 700 to become unstable. Since the fixed DMD threshold is less than the maximum output inductor current ILo and greater than the minimum output inductor current ILo, the logic circuitry 110 shuts down the transistor Mp1 in each period, thereby causing the slope of the output inductor current ILo to change from m2 to m3, as illustrated in FIG. 9B. Since the slope of the output inductor current ILo changes from m2 to m3, there may be no proper slope compensation waveform that satisfies all input and output voltages as explained in greater detail below. Without proper slope compensation, perturbation of the output inductor current ILo may cause the circuit 700 to oscillate between DCM and CCM. Accordingly, the circuit 700 may be unstable during the middle load condition. The instability of the circuit 700 during a middle load condition is further explained below with reference to the example waveforms 1002 and 1004 illustrated in FIGS. 10A and 10B, and the example waveforms 1100 illustrated in FIG. 11.

In the heavy load condition, the converter circuit 700 operates in the continuous current mode, and the minimum output inductor current ILo is larger than the fixed DMD threshold. Since the DMD threshold is less than the minimum output inductor current ILo, the discharging output inductor current ILo does not reach the DMD threshold, and thus, the DMD circuitry 702 does not instruct the logic circuitry 110 to turn off transistor Mp1. As such, the slope of the discharging output inductor current ILo does not change from a first falling slope m2 to a second falling slope (e.g., m3). Therefore, proper slope compensation may be provided for the circuit 700 during the heavy load condition, and thus, the circuit 700 is stable during the heavy load condition.

Figure 10A:
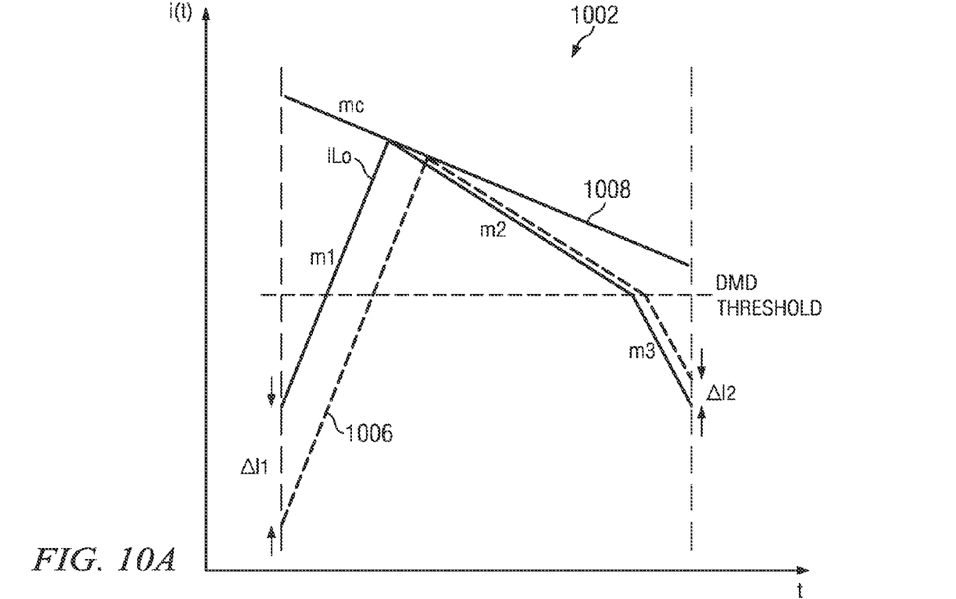
FIGS. 10A and 10B illustrate example waveforms showing perturbation of an output inductor current for first and second slope compensation formulas when a middle output load condition is experienced by the circuit illustrated in FIG. 7.
Figure 10B:
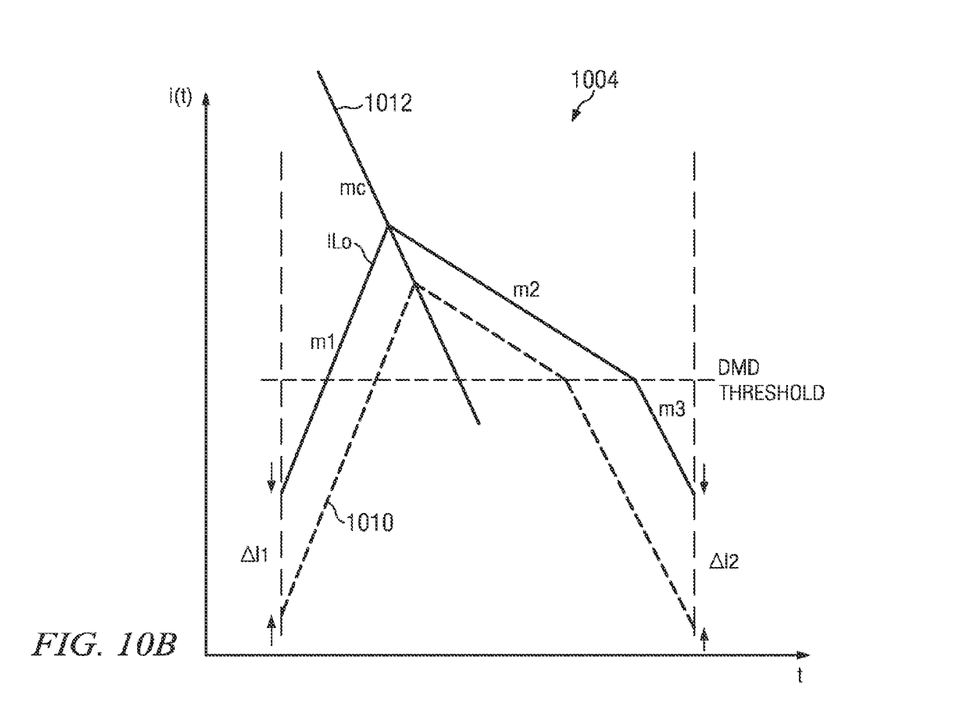

As mentioned above, there may be no proper slope compensation waveform that satisfies all input and output voltages when the circuit 700 is operating during a middle load condition. As a result, for instances in which a proper slope compensation waveform is achievable, the waveform may be limited to having a falling compensation slope mc within a limited range. FIGS. 10A and 10B are provided to illustrate the difficulty of achieving a proper fixed falling compensation slope mc, when the circuit 700 is operating in a middle load condition. FIG. 10A illustrates an example embodiment wherein the magnitude of the falling compensation slope mc is less than the magnitude of a first falling slope m2 of an output inductor current ILo. FIG. 10B illustrates a second example embodiment wherein the magnitude of the falling compensation slope mc is greater than the magnitude of a first falling slope m2 of an output inductor current ILo. FIGS. 10A and 10B are further described below.

FIG. 10A illustrates a period of an example output inductor current ILo and a perturbed output inductor current waveform 1006 having a first perturbation $\Delta I_1$ at the start of the period and a second perturbation $\Delta I_2$ at the end of the period. The output inductor current ILo and perturbed output inductor current waveform 1006 have a rising slope m1, a first falling slope m2 and a second falling slope m3. FIG. 10A also illustrates a slope compensation waveform 1008 having a falling compensation slope mc, wherein the absolute value of the falling compensation slope mc is less than the absolute value of the first falling slope m2. When the second perturbation $\Delta I_2$ is greater than the first perturbation $\Delta I_1$, perturbation of the output inductor current ILo is amplified, which will eventually cause the circuit 700 to oscillate between DCM and CCM. However, when the second perturbation $\Delta I_2$ is less than the first perturbation $\Delta I_1$, the perturbation is attenuated. In order to achieve this attenuation when the magnitude of the falling compensation slope mc is less than the magnitude of the first falling slope m2, the falling compensation slope mc may be calculated in accordance with the following equation: mc>(m2(m3−m1))/(m3+m2), wherein m1=Vin/L; m2=(Vout−Vin)/L; and m3=(Vout−Vin+Vdiode)/L.

FIG. 10B illustrates a period of an example output inductor current ILo, a perturbed output inductor current waveform 1010, and a slope compensation waveform 1012, wherein the output inductor current ILo and perturbed output inductor current waveform 1010 have a rising slope m1, a first falling slope m2 and a second falling slope m3, and the slope compensation waveform 1012 has a compensation slope mc. In the embodiment illustrated in FIG. 10B, the absolute value of the falling compensation slope mc is greater than the absolute value of the first falling slope m2. In this embodiment, the second perturbation $\Delta I_2$ must again be less than the first perturbation $\Delta I_1$ to obtain an attenuating perturbation. In order to achieve this attenuation when the magnitude of the falling compensation slope mc is greater than the magnitude of the first falling slope m2, the compensation slope mc may be calculated in accordance with the following equation: mc<(m2(m3+m1))/(m3−m2).

In view of the foregoing, in order to select a proper slope compensation waveform when the circuit 700 is operating during a middle load condition, a slope compensation waveform should have a compensation slope mc calculated in accordance with the following equation: (m2(m3−m1))/(m3+m2)<mc<(m2(m3+m1))/(m3−m2), referred to herein after as the middle load compensation slope formula. The middle load compensation slope formula demonstrates a range for a particular compensation slope mc. However, since this range is usually very narrow, and the slopes m1, m2, m3 and mc may fluctuate due to parasitic resistances, temperature variations, and other factors, a proper compensation slope mc may be very difficult to obtain and, in some cases, may even be impossible to achieve.

FIG. 11 illustrates example waveforms 1100, wherein a slope compensation waveform 1102 is provided having a compensation slope mc>0.5*m2. Although the compensation slope mc provided in accordance with the waveforms 1100 in FIG. 11 satisfies the original compensation slope formula discussed above with respect to FIG. 5 (i.e., mc>0.5*m2), the compensation slope mc fails to satisfy the middle load compensation slope formula discussed above with respect to FIGS. 10A and 10B. Therefore, as shown in FIG. 11, perturbation of the output inductor current ILo is amplified, causing the circuit 700 to oscillate between DCM and CCM. Since this oscillation occurs during the middle load condition when the converter circuit 700 operates in a border region of DCM and CCM, the oscillation is referred to herein as DCM-CCM oscillation.

Figure 12:
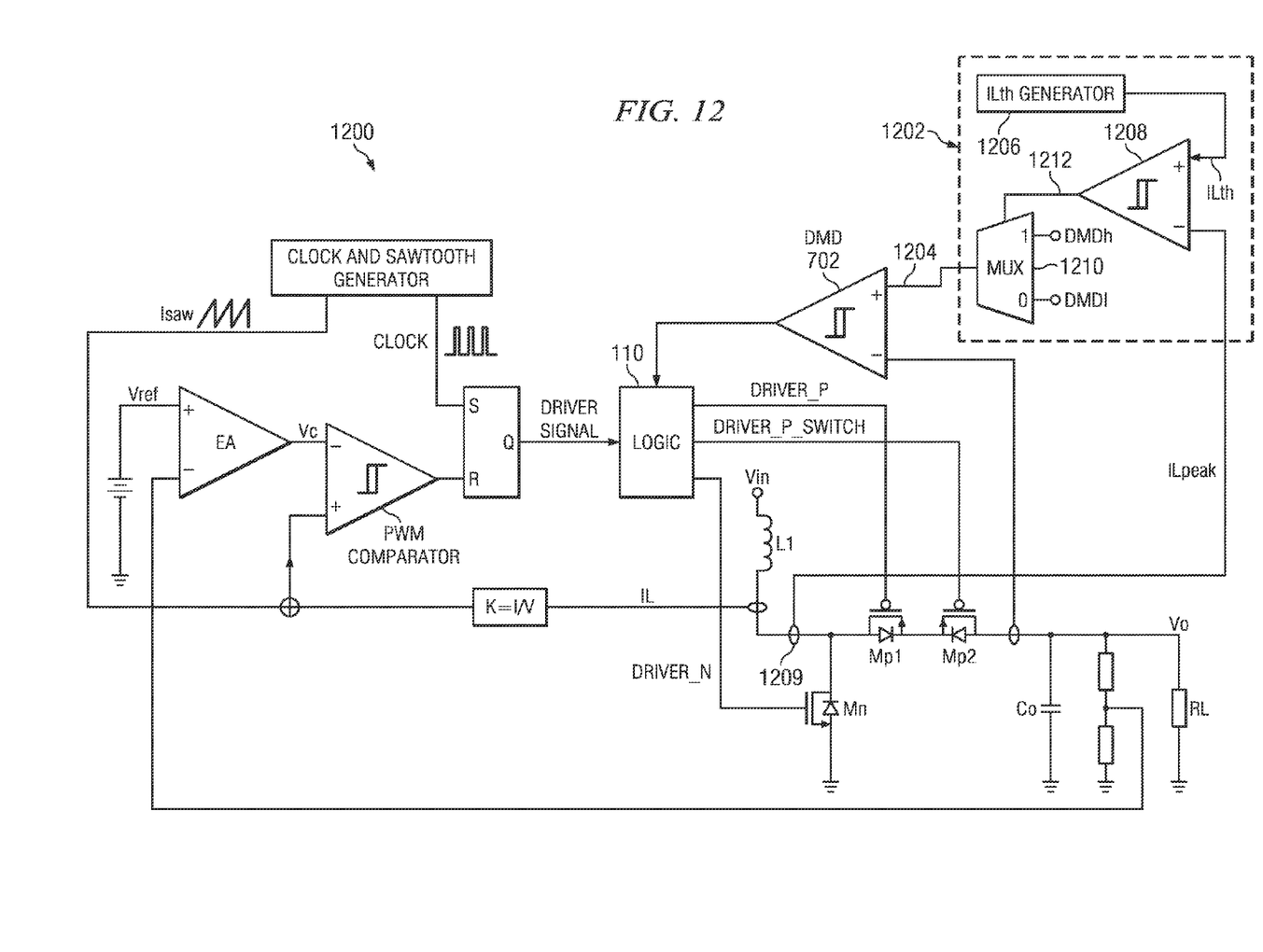
FIG. 12 illustrates an example embodiment of a constant-frequency current-mode-controlled boost converter circuit in accordance with the present disclosure.

The larger the input voltage range and the output voltage range of the circuit 700 illustrated in FIG. 7, the more difficult it is to provide a fixed slope compensation mc that satisfies the middle load compensation slope formula. Therefore, in order to avoid DCM-CCM oscillation in a middle load condition, the circuit 700 illustrated in FIG. 7 may be modified to adjust or otherwise disable the DMD threshold provided during the middle load condition. One example of a circuit modified in this manner is illustrated in FIG. 12, which is now referred to hereinafter as circuit 1200. Accordingly, circuit 1200 illustrates an example embodiment of a constant-frequency current-mode-controlled boost converter circuit 1200, wherein the circuit 1200 includes slope compensation of the output inductor current ILo, reduces reverse inductor current in light output load conditions, and reduces DCM-CCM oscillation.

Figure 13A:
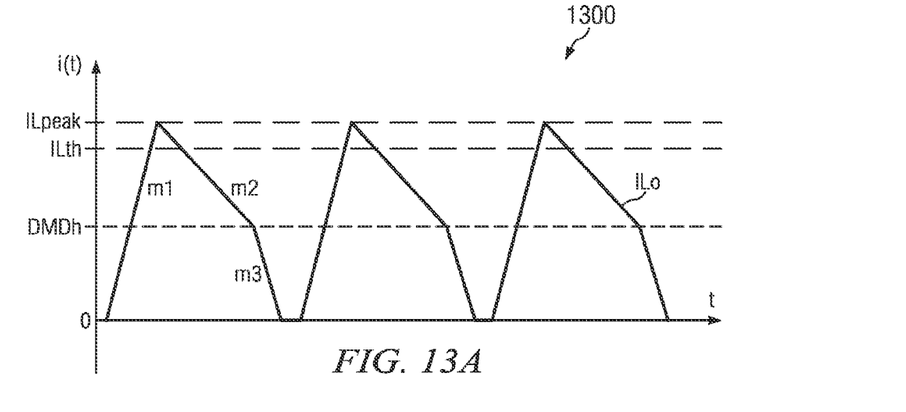
FIGS. 13A, 13B, and 13C illustrate example waveforms of an output inductor current for various output load conditions of the circuit illustrated in FIG. 12.
Figure 13B:
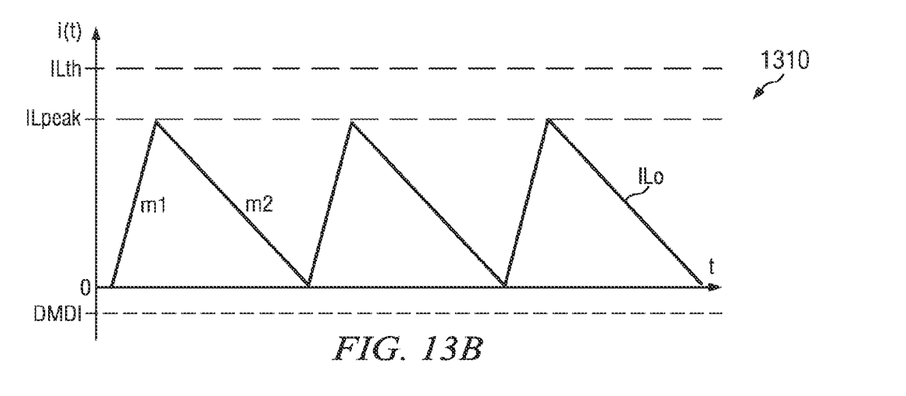
Figure 13C:
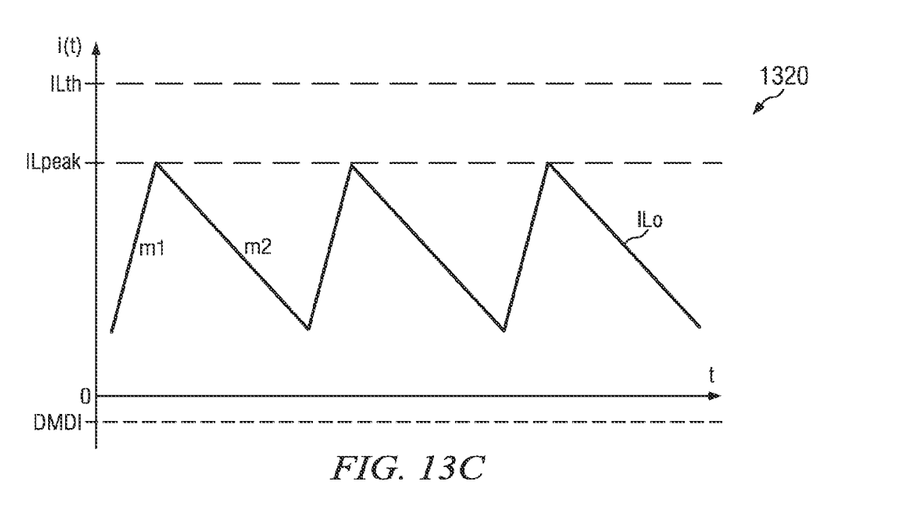

As illustrated in FIG. 12, the circuit 1200 includes additional DMD circuitry 1202 coupled to a DMD threshold input 1204 of the DMD circuitry 702, wherein the additional DMD circuitry 1202 comprises a reference current generator 1206, comparator 1208, and multiplexer 1210. The additional DMD circuitry 1202 is operable to provide one of a high DMD threshold (DMDh) or a low DMD threshold (DMDl) at the DMD threshold input 1204 of the DMD circuitry 702. It should be appreciated that the low DMD threshold DMDl may not necessarily be a negative value as shown in FIGS. 13B and 13C, but rather, a value that is below the minimum output inductor current ILo during both the middle and heavy load conditions. In essence, the disclosed constant-frequency current-mode-controlled boost converter circuit 1200 enables a DMD threshold when the circuit 1200 operates in a light output load condition, and disables the DMD threshold when the circuit 1200 operates in a middle or heavy output load condition. In accordance with the present disclosure, the DMDh threshold is generally selected (i.e., the DMD threshold is enabled) during a light output load condition to avoid reverse inductor current IL, whereas the DMDl threshold is generally selected (i.e., the DMD threshold is disabled) during a middle output load condition (and heavy output load condition) to avoid DCM-CCM oscillation.

A first input of the comparator 1208 is coupled via current sensor 1209 to a node located between the inductor L1 and the drain of transistor Mn to detect a peak inductor current ILpeak. The comparator 1208 detects the peak value of the inductor current (ILpeak) when the converter circuit 1200 enters from DCM to CCM or from CCM to DCM, and then compares the peak inductor current ILpeak to a peak current threshold ILth generated by the reference current generator 1206. The peak current threshold ILth may be determined in accordance with the value of the inductor L1, input voltage Vin, output voltage V0, as well as other factors. For example, in the embodiment illustrated in FIG. 1200, the peak current threshold ILth may be calculated in accordance with the following equation:

$$ILth = DT\frac{V_{in}}{L}$$
$$= \frac{V_o - V_{in}}{V_o}T\frac{V_{in}}{L}$$
$$= \frac{T}{L} \cdot \frac{V_{in}(V_o - V_{in})}{V_o},$$

wherein L is the value of the inductor L1, D is the duty cycle, and T is the period.

The comparator 1208 produces a logic control signal 1212 for controlling the multiplexer 1210. When the peak inductor current ILpeak is greater than the peak current threshold ILth, the control signal 1212 is logic high, and thus, the DMD threshold is enabled when the multiplexer 1210 selects the high DMD threshold value (DMDh), which is then supplied to the DMD threshold input 1204 of the DMD circuitry 702. Conversely, when the peak inductor current ILpeak is less than the peak current threshold ILth, the control signal 1212 is logic low, and the DMD threshold is disabled when the multiplexer 1210 selects the low DMD threshold value (DMDl), which is then supplied to the DMD threshold input 1204 of the DMD circuitry 702. As such, the additional DMD circuitry 1202 is operable to enable or disable the DMD threshold by selecting the proper DMD threshold value in response to the peak current ILpeak detected on the inductor L1. Operation of the boost converter circuit 1200 is further described herein with reference to the various waveforms provided in FIGS. 13A, 13B, and 13C.

During a light output load condition, the converter circuit 1200 is operating in DCM, and the high DMD threshold value DMDh is selected by the additional DMD circuitry 1202. FIG. 13A illustrates an example waveform 1300 for an embodiment in which the circuit 1200 is operating in a light output load condition. Since the peak inductor current ILpeak is greater than the peak current threshold ILth, the high DMD threshold DMDh is selected. The output inductor current ILo has a rising slope m1, a first falling slope m2, and a second falling slope m3. Since the circuit 1200 is operating in the light load condition, the circuit 1200 is operating in discontinuous current mode and, therefore, the output inductor current ILo reduces to zero for each period. It should be appreciated by those of ordinary skill in the art that, even if a slope compensation waveform (not shown) is selected with a falling compensation slope mc having a relatively large magnitude (i.e., larger than the range allowed by the middle load compensation slope formula), any perturbation of the output inductor current ILo is "reset" to zero for each period due to the circuit 1200 operating in discontinuous current mode. As such, the disclosed boost converter circuit 1200 is stable in the light load condition, and reduces reverse inductor current by instructing the logic circuitry 110 to shut off transistor Mp1 when the discharging output inductor current ILo reaches the high DMD threshold value DMDh.

During a medium output load condition, the converter circuit 1200 is operating in CCM, and the low DMD threshold value DMDl is selected by the additional DMD circuitry 1202. FIG. 13B illustrates an example waveform 1310 for an embodiment in which the circuit 1200 is operating in a continuous current mode while in a medium output load condition. Since the peak inductor current ILpeak is less than the peak current threshold ILth, the low DMD threshold DMDl is selected. As shown in FIG. 13B, the output inductor current ILo has a first rising slope m1 and a first falling slope m2. Since the DMDl threshold is less than the minimum output inductor current ILo, the discharging output inductor current ILo does not reach the DMDl threshold, and thus, the DMD circuitry 702 does not instruct the logic circuitry 110 to turn off transistor Mp1. As such, the falling slope m2 of the output inductor current ILo does not change from the first falling slope m2 to a second falling slope (e.g., m3). Therefore, in accordance with the embodiment illustrated in FIG. 12, any proper slope compensation waveform (not shown) is not limited to having a compensation slope mc determined in accordance with the middle load compensation slope formula discussed above with respect to FIGS. 10A, 10B, and 11, but rather, may be determined in accordance with the original slope compensation formula discussed above with respect to FIG. 5 (i.e., mc>0.5*m2). Since a proper slope compensation waveform may be selected for all ranges of input and output voltage, the disclosed boost converter circuit 1200 does not oscillate between DCM and CCM, and thus, is stable during middle load conditions.

During a heavy output load condition, the converter circuit 1200 is operating in CCM, and the low DMD threshold value DMDl is selected by the additional DMD circuitry 1202. FIG. 13C illustrates an example waveform 1320 for an embodiment in which the circuit 1200 is operating in a continuous current mode while in a heavy output load condition. Since the peak inductor current ILpeak is less than the peak current threshold ILth, the low DMD threshold DMDl is selected. As shown in FIG. 13C, the output inductor current ILo has a first rising slope m1 and a first falling slope m2. Since the DMDl threshold is less than the minimum output inductor current ILo, the discharging output inductor current ILo does not reach the DMDl threshold, and thus, the DMD circuitry 702 does not instruct the logic circuitry 110 to turn off transistor Mp1. As such, the falling slope m2 of the output inductor current ILo does not change from the first falling slope m2 to a second falling slope (e.g., m3). Therefore, proper slope compensation may be provided for the circuit 1200 during the heavy load condition, and thus, the circuit 1200 is stable during the heavy load condition.

In view of the foregoing, the constant-frequency current-mode-controlled boost converter circuit 1200 illustrated in FIG. 12 includes slope compensation of the inductor current IL, reduces reverse inductor current in light output load conditions, and reduces DCM-CCM oscillation by enabling or disabling a DMD threshold (by adjusting the value of the DMD threshold). Accordingly, the disclosed circuit 1200 is efficient and stable in light, medium, and heavy output load conditions.

It should be appreciated by one of ordinary skill in the art that the embodiments disclosed herein are provided to illustrate one or more examples for implementing a constant-frequency current-mode-controlled converter circuit that is efficient and stable in light, medium, and heavy output load conditions. As such, variations to the circuit disclosed herein may be made without departing from the spirit or scope of the present disclosure as set forth in the claims provided below. For example, although a boost converter circuit is described herein, it should be appreciated that the disclosure may also be applied to buck converter or buck-boost converter circuitry.

What is claimed is:

1. An integrated circuit comprising:
   driver circuitry operable to control charging and discharging of an inductor; and
   current-sensing circuitry operable to sense a load condition of the integrated circuit;
   wherein the current-sensing circuitry is further operable, in response to a light load condition, to enable an inductor current threshold and, in response to one of a middle load condition or a heavy load condition, to disable the inductor current threshold;
   wherein the inductor current threshold is a high inductor current threshold value when the inductor current threshold is enabled, and the inductor current threshold is a low inductor current threshold value when the inductor current threshold is disabled, wherein the low inductor current threshold value is less than a minimum value of an output inductor current, and
   wherein the driver circuitry is further operable to adjust the discharging of the inductor when the output inductor current reaches the inductor current threshold.

2. The integrated circuit as set forth in claim 1, wherein the integrated circuit is a constant-frequency current-mode-controlled converter circuit.

3. The integrated circuit as set forth in claim 1, further comprising slope compensation circuitry operable to produce a slope compensation waveform to reduce perturbation of the output inductor current.

4. An integrated circuit comprising:
    driver circuitry operable to control charging and discharging of an inductor; and
    current-sensing circuitry operable to sense a load condition of the integrated circuit, the current-sensing circuitry comprising:
        a first comparator coupled to the inductor, the first comparator operable to compare the inductor current to a reference current to determine the load condition of the integrated circuit, and to output a multiplexer control signal indicative of either a first load condition or a second load condition;
        a multiplexer operable to receive the multiplexer control signal and, responsive thereto, to enable an inductor current threshold in response to the multiplexer control signal indicating the first load condition, or to disable the inductor current threshold in response to the multiplexer control signal indicating the second load condition; and
        a second comparator coupled to an output node of the integrated circuit, the second comparator operable to compare an output inductor current to the inductor current threshold, and to output a driver control signal when the output inductor current reaches the inductor current threshold,
    wherein the driver circuitry is operable, in response to the driver control signal, to adjust the discharging of the inductor.

5. The integrated circuit as set forth in claim 4, wherein the multiplexer control signal is indicative of the first load condition when a peak value of the inductor current is greater than the reference current.

6. The integrated circuit as set forth in claim 4, wherein the inductor current threshold is set to a high inductor current threshold value when the inductor current threshold is enabled.

7. The integrated circuit as set forth in claim 4, wherein the multiplexer control signal is indicative of the second load condition when a peak value of the inductor current is less than the reference current.

8. The integrated circuit as set forth in claim 4, wherein the inductor current threshold is set to a low inductor current threshold value when the inductor current threshold is disabled.

9. The integrated circuit as set forth in claim 8, wherein the low inductor current threshold value is less than a minimum value of the output inductor current.

10. The integrated circuit as set forth in claim 4, wherein the driver circuitry is responsive to the driver control signal to reduce the discharging of the inductor.

11. A method for controlling charging and discharging of an inductor in an integrated circuit, the method comprising:
    charging the inductor to generate an inductor current;
    sensing a load condition of the integrated circuit by comparing the inductor current to a reference current;
    generating a control signal indicative of either a first load condition or a second load condition;
    enabling an inductor current threshold if the control signal is indicative of the first load condition;
    disabling the inductor current threshold if the control signal is indicative of the second load condition;
    comparing an output inductor current to the inductor current threshold;
    discharging the inductor at a first rate when the output inductor current is greater than the inductor current threshold; and
    discharging the inductor at a second rate when the output inductor current is less than the inductor current threshold.

12. The method as set forth in claim 11, wherein the integrated circuit is a constant-frequency current-mode-controlled converter circuit.

13. The method as set forth in claim 11, further comprising providing a slope compensation waveform to reduce perturbation of the output inductor current.

14. The method as set forth in claim 11, wherein the first load condition is a light output load condition, and the second load condition is one of a middle output load condition or a heavy output load condition.

15. The method as set forth in claim 11, wherein the control signal is indicative of the first load condition when
    a peak value of the inductor current is greater than the reference current; and
    wherein the control signal is indicative of the second load condition when the peak value of the inductor current is less than the reference current.

16. The method as set forth in claim 11,
    wherein the inductor current threshold is set to a high inductor current threshold value when the inductor current threshold is enabled; and
    wherein the inductor current threshold is set to a low inductor current threshold value when the inductor current threshold is disabled.

17. The method as set forth in claim 16, wherein the low inductor current threshold value is less than a minimum value of the output inductor current.

18. A method for controlling charging and discharging of an inductor in an integrated circuit, the method comprising:
    charging the inductor to generate an inductor current;
    comparing the inductor current to a reference current;
    selecting a high inductor current threshold if a peak value of the inductor current is greater than the reference current;
    selecting a low inductor current threshold if the peak value of the inductor current is less than the reference current;
    comparing an output inductor current to the selected inductor current threshold;
    discharging the inductor at a first rate when the output inductor current is greater than the high inductor current threshold; and
    discharging the inductor at a second rate when the output inductor current is less than the high inductor current threshold.

19. The method as set forth in claim 18, further comprising providing a slope compensation waveform to reduce perturbation of the output inductor current.

20. An integrated circuit comprising:
    driver circuitry operable to control charging and discharging of an inductor; and
    current-sensing circuitry operable to compare an inductor current to a reference current;
    wherein the current-sensing circuitry is further operable to select a high inductor current threshold when a peak value of the inductor current is greater than the reference current, and to select a low inductor current threshold when the peak value of the inductor current is less than the reference current, wherein the low inductor current threshold is less than a minimum value of an output inductor current; and
    wherein the driver circuitry is further operable to discharge the inductor at a first rate when the output inductor current is greater than the high inductor current threshold, and to discharge the inductor at a second rate when the output inductor current is less than the high inductor current threshold.

21. The integrated circuit as set forth in claim 20, wherein the integrated circuit is a constant-frequency current-mode-controlled converter circuit.

22. The integrated circuit as set forth in claim 20, further comprising slope compensation circuitry operable to produce a slope compensation waveform to reduce perturbation of the output inductor current.

23. The integrated circuit as set forth in claim 20, wherein the high inductor current threshold is selected when the integrated circuit is operating in a light output load condition, and the low inductor current threshold is selected when the integrated circuit is operating in one of a middle load condition or a heavy load condition.

24. The integrated circuit as set forth in claim 20, wherein the low inductor current threshold is less than a minimum value of the output inductor current.

25. An integrated circuit comprising:
   driver circuitry operable to control charging and discharging of an inductor; and
   current-sensing circuitry comprising:
      a first comparator coupled to the inductor, the first comparator operable to compare the inductor current to the reference current, and to output a multiplexer control signal in response thereto;
      a multiplexer operable to receive the multiplexer control signal and, responsive thereto, to select a high inductor current threshold or select a low inductor current threshold; and
      a second comparator coupled to an output node of the integrated circuit, the second comparator operable to compare an output inductor current to the selected high or low inductor current threshold, and to output a driver control signal in response thereto,
   wherein the driver circuitry is further operable, in response to the driver control signal, to discharge the inductor at a first rate when the output inductor current is greater than the high inductor current threshold.

26. The integrated circuit as set forth in claim 25, wherein the multiplexer selects the high inductor current threshold when a peak value of the inductor current is greater than the reference current.

27. The integrated circuit as set forth in claim 25, wherein the multiplexer selects the low inductor current threshold when a peak value of the inductor current is less than the reference current.

28. The integrated circuit as set forth in claim 25, wherein the driver circuitry is responsive to the driver control signal to discharge the inductor at a second rate when the output inductor current is less than the high inductor current threshold.

* * * * *